United States Patent [19]

Scaramucci

[11] 4,230,150
[45] Oct. 28, 1980

[54] TILTING DISC CHECK VALVE

[76] Inventor: Domer Scaramucci, 3245 S. Hattie, Oklahoma City, Okla. 73129

[21] Appl. No.: 14,124

[22] Filed: Feb. 22, 1979

[51] Int. Cl.³ ............................................. F16K 15/03
[52] U.S. Cl. ................................. 137/527; 137/527.8
[58] Field of Search .............. 137/527, 527.2, 527 A, 137/527.6, 527.8

[56] References Cited

U.S. PATENT DOCUMENTS

| 286,676 | 10/1883 | Belknap et al. | 137/515.7 |
|---|---|---|---|
| 2,532,067 | 11/1950 | La Boul | 137/527.8 X |
| 3,491,796 | 1/1970 | Scaramucci | 137/614.2 |
| 3,933,173 | 1/1976 | Kajita | 137/527.8 |
| 3,934,608 | 1/1976 | Guyton | 137/527.8 |
| 4,075,832 | 2/1978 | Diesinger et al. | 137/527 |
| 4,128,111 | 12/1978 | Hansen | 137/515.7 |

Primary Examiner—William R. Cline
Attorney, Agent, or Firm—Dunlap, Codding & McCarthy

[57] ABSTRACT

A tilting disc check valve is provided with a valve assembly comprising a clapper assembly and an annular seal member. The seal member abuts an annular face extending about an inlet passage of the valve and the opposing face of the seal member is abutted by a clapper support member, forming a portion of the clapper assembly, having the form of an interrupted ring. A clapper is pivotally mounted on the clapper support member via a tab extending into the interruption formed therein. A hole formed in the clapper support member and intersecting the interruption thereof and an aperture formed through the tab permit the tab to be connected to the clapper support member via the insertion of a pin into the hole and the aperture.

14 Claims, 8 Drawing Figures

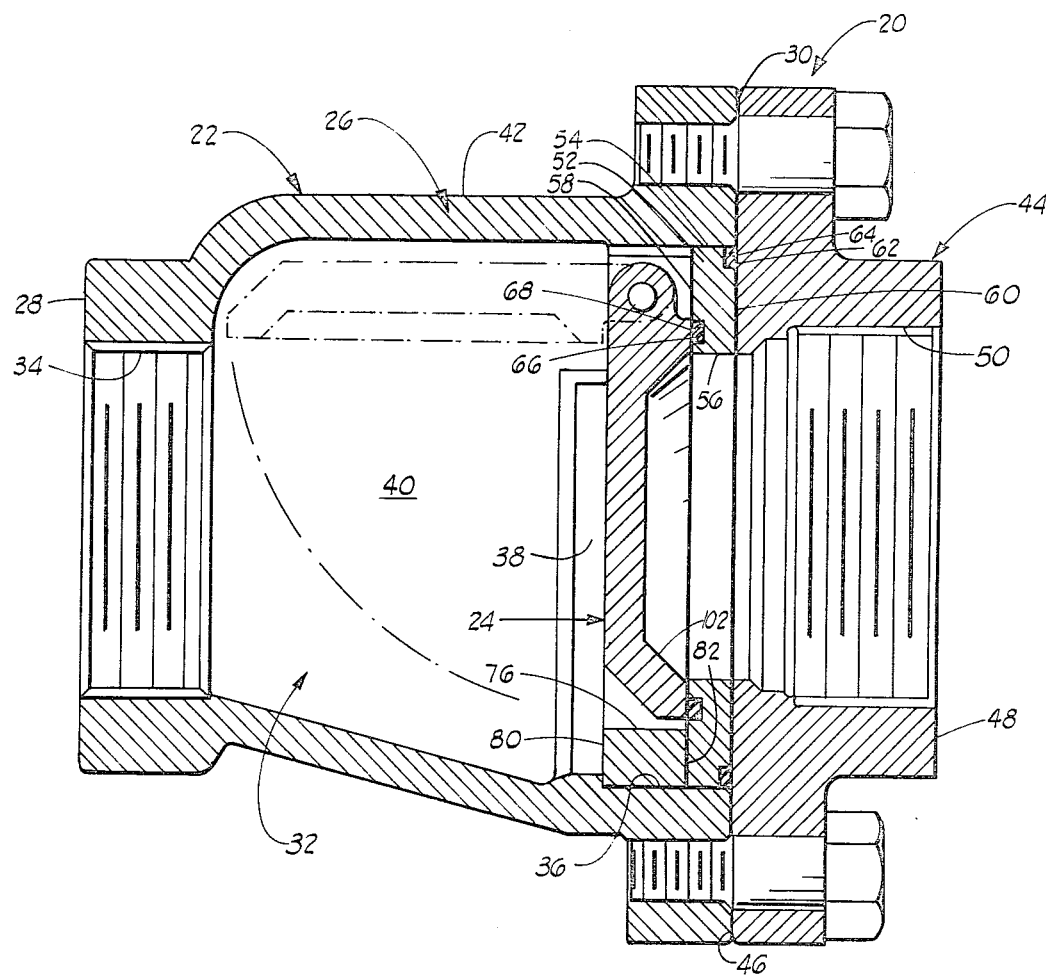

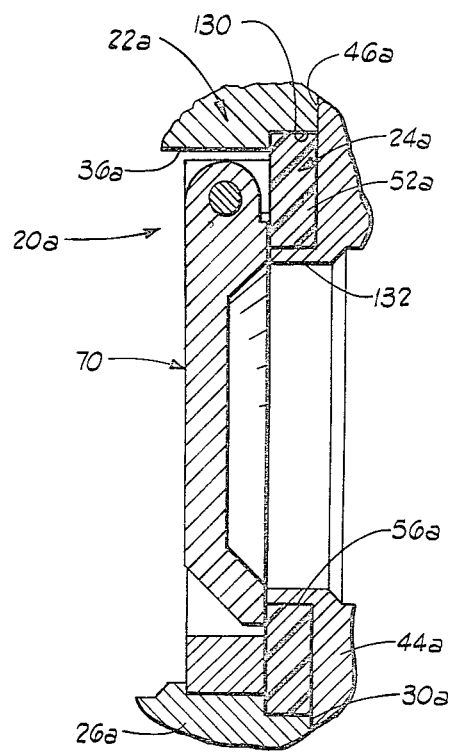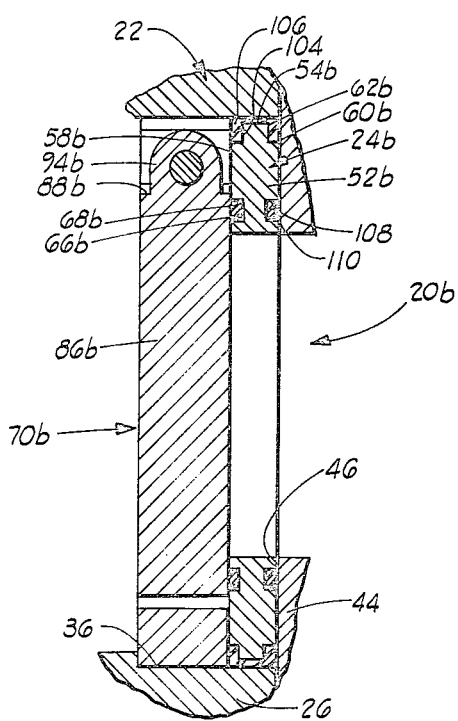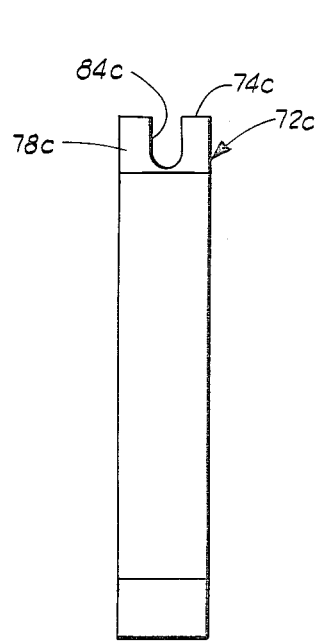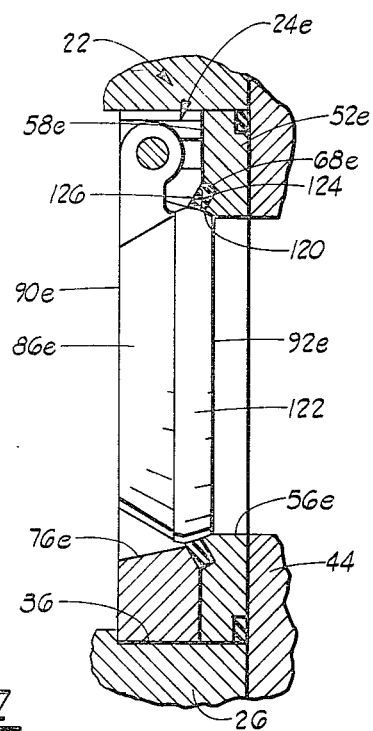

TILTING DISC CHECK VALVE

BACKGROUND OF THE INVENTION

1. Field of the Invention

This invention relates generally to improvements in tilting check valves and, more particularly, but not by way of limitation, to improvements facilitating rapid and inexpensive repair of valves which have become worn in use.

2. Discussion of the Prior Art

In many industrial processes, it is necessary to provide for unidirectional flow through a number of conduits which transport fluids about plants wherein the processes are carried out. When the conduits are of relatively large diameter, it is common to use a check valve of the tilting disc type for this purpose. Such valves generally provide dependable service at reasonable cost and are, accordingly, in widespread use. A tilting disc check valve generally comprises a clapper pivotally mounted within the body of the valve to pivot toward or away from an annular seat. Fluid flow from one side of the clapper forces the clapper away from the seat to permit passage of the fluid through the valve while backflow is prevented by pivotation of the clapper against the seat. Examples of such construction are found in the applicant's U.S. Pat. No. 3,491,796, issued Jan. 27, 1970, and in U.S. Pat. No. 3,934,608, issued Jan. 27, 1976 to Guyton.

While tilting disc check valves have proven themselves to be useful and dependable devices, they are, as is the case with any type of valve, subject to wear so that valves must be periodically repaired. It is known to accomplish repair by replacing a valve assembly which forms a distinct component of the valve and is mounted in a valve body which can be removed temporarily from a conduit or which can be disassembled. Examples of valves including replaceable valve assemblies are the valves disclosed in U.S. Pat. No. 4,128,111, issued Dec. 5, 1978 to Hansen et al. and in U.S. Pat. No. 286,676, issued Oct. 16, 1883 to Belknap et al.

SUMMARY OF THE INVENTION

The present invention contemplates a tilting disc check valve having a replaceable valve assembly which can be machined at low cost and which can be repaired in the field so that only worn components of the valve assembly need be replaced to repair the valve. To this end, the valve assembly is formed in two parts: a clapper assembly and a seal member which is positioned to one side of the clapper assembly in the assembled valve. The clapper assembly, in turn, comprises a clapper support member having the form of an interrupted ring and a clapper pivotally mounted on the clapper support member via a tab extending into the interruption in the clapper support member. A pin passing through an aperture in the clapper support member and a hole in the tab permits the clapper to be replaced in the clapper support member in the field and repair of a valve can be affected by replacing the clapper support member, the clapper or the seal member or any combination thereof.

An object of the present invention is to provide a tilting disc check valve having a replaceable valve assembly which is inexpensive to manufacture.

A further object of the invention is to provide a replaceable valve assembly for a tilting disc check valve wherein the valve assembly is repairable in the field.

Other objects, advantages and features of the present invention will become clear from the following detailed description of the preferred embodiments of the invention when read in conjunction with the drawings in the appended claims.

BRIEF DESCRIPTION OF THE DRAWINGS

FIG. 1 is a cross-section in side elevation of a valve constructed in accordance with the present invention and including one preferred embodiment of the valve assembly.

FIG. 2 is a cross-section in side elevation of the clapper assembly of the valve assembly shown in FIG. 1.

FIG. 3 is a rear elevational view of the clapper assembly of FIG. 2.

FIG. 4 is a fragmentary cross-section in side elevation of a valve similar to the valve of FIG. 1 and showing a second embodiment of the valve assembly.

FIG. 5 is a fragmentary cross-section similar to FIG. 4 showing another embodiment of the valve assembly.

FIG. 6 is a cross-section in side elevation of a modified clapper support member for a valve assembly similar to the valve assembly shown in FIGS. 1 through 3.

FIG. 7 is a cross-section in side elevation of another modified clapper support member.

FIG. 8 is a fragmentary cross-section similar to FIG. 4 showing another embodiment of the valve assembly.

DESCRIPTION OF THE PREFERRED EMBODIMENTS

Referring now to the drawings in general and to FIG. 1 in particular, shown therein and designated by the general reference numeral 20 is a tilting disc check valve constructed in accordance with the present invention. In general, the valve 20 comprises a body 22 and a valve assembly 24 disposed within the body 22.

The body 22 includes a casing 26 having a first end 28 and a second end 30. The casing 26 is hollow and medial portions thereof form a valve chamber 32. A bore 34 is formed through portions of the casing 26 defining the first end 28 thereof, the bore 34 intersection the first end 28 of the casing 26 and extending therefrom through the valve chamber 32 to form an outlet passage for the body 22. The bore 34 can be internally threaded to facilitate the coupling of the valve 20 to a conduit receiving fluid via the outlet passage of the valve 20.

An arcuate ridge 38 is formed on the interior surface 40 of the casing 26 and extends circumferentially about a portion of the interior surface 40 of the casing 26. A portion 36 of the surface 40, intersecting the ridge 38, is counterbored to form a circular valve assembly pocket adjacent the second end 30 of the casing 26 as will be described below. The casing 26 generally converges from the second end 30 to the first end 28 and a portion 42 of the casing 26 is bulged radially outwardly for a purpose to be discussed below.

The second end 30 of the casing 26 has the form of a planar annulus extending radially from the counterbored portion 36 of the interior surface 40 of the casing 26 and the body 22 comprises an annular cap 44 which is bolted to the second end 30 of the casing 26 to assemble the body 22. The cap 44 has a planar first end 46, abutting the second end 30 of the casing 26 and an opposite second end 48. A bore 50 is formed through the cap 44 and intersects the first end 46 thereof and the second end 48 thereof to form an inlet passage for the body 22. The bore 50 can be internally threaded to facilitate coupling of the valve 20 into a conduit.

In the assembled body 22, the bore 50 is disposed coaxially with the counterbored portion 36 of the interior surface 40 of the casing 26 and portions of the bore 50 adjacent the first end 46 of the cap 44 are formed on a diameter smaller than the diameter of the counterbored portion 36. Thus, a portion of the first end 46 of the cap 44 extends radially inwardly from the periphery of the counterbored portion 36 to present an annular face opposing the ridge 38 and spaced a preselected distance therefrom. The ridge 38, the first end 46 of the cap 44, and the counterbored portion 36 of the interior surface 40 of the casing 26 coact to form the valve assembly pocket. In the assembled valve 20, the valve assembly 24 is disposed in the valve assembly pocket and is clamped therein between the ridge 38 and the first end 46 of the cap 44.

The valve assembly 24 comprises a ring-shaped seal member 52 having an outer periphery 54 formed on a diameter substantially equal to the diameter of the counterbored portion 36 of the interior surface 40 of the casing 26. A bore 56 is formed through the seal member 52 concentrically with the outer periphery 54 thereof and the bore 56 has a diameter substantially equal to the diameter of portions of the cap bore 50 adjacent the first end 46 of the cap 44. The seal member 52 has a planar first side 58 extending radially inwardly from the outer periphery 54 thereof to the bore 56 thereof and a parallel, annular second side 60. In the assembled valve 20, the second side 60 of the seal member 52 abuts the first side 46 of the cap 44. An annular groove 62 is formed on the second side 60 of the seal member 52 and intersects the outer peripher 54 thereof. An elastomeric sealing ring 64 is disposed in the annular groove 62 and the sealing ring 64 engages the first end 46 of the cap 44 to prevent leakage of fluid about the valve assembly 24 in the assembled valve 20. An annular groove 66 is formed in the first side 58 of the seal member 52 and extends concentrically about the seal member bore 56. The groove 66 is spaced a distance from the seal member bore 46 and contains an elastomeric sealing ring 68 for a purpose to be described below.

The valve assembly 24 further comprises a clapper assembly 70 more particularly shown in FIGS. 2 and 3. The clapper assembly 70 includes a clapper support member 72 which has the general form of an interrupted ring. This is, the clapper support member 72 has a circular outer peripher 74 and a concentric, circular bore 76. An interruption 78 is formed in one side of the clapper support member 72, the interruption 78 intersecting the bore 76 and the outer periphery 74 of the clapper support member 72 and extending therebetween symmetrically about a radius of the periphery 74. In the assembled valve 20, as shown in FIG. 1, the bore 76 of the clapper support member 72 is disposed concentrically with the bore 56 of the seal member 52 and coacts therewith to form a valve assembly bore interposed between the bore 34 of the casing 26, forming the outlet passage of the valve 20, and the bore 50 in the cap 44, forming the inlet passage of the valve 20.

As shown in FIG. 2, the clapper support member 72 has parallel first and second ends, 80 and 82 respectively, which are disposed generally perpendicularly to the axis of the bore 76. The width of the clapper support member 72, between the ends 80 and 82 thereof, and the width of the seal member 52 between the sides 58 and 60 thereof, are selected such that the valve assembly 24 extends the length of the valve assembly pocket formed by the ridge 38, the first end 46 of the cap 44 and the counterbored portion 36 of the interior surface 40 of the casing 26. In the assembled valve 20, as shown in FIG. 1, the second end 82 of the clapper support member 70 abuts the first side 58 of the seal member 52 to form the valve assembly 24. The valve assembly 24 is placed in the valve assembly pocket with the first end 80 of the clapper support member 72 engaging the ridge 38 and with the second side 60 of the seal member 52 engaging the first side 46 of the cap 44 so that the ridge 38 and the cap 44 clamp the valve assembly 24 in the valve assembly pocket. In such position of the valve assembly 24, the clapper assembly 70 abuts the seal member 52 and is disposed between the seal member 52 and the outlet passage formed by the bore 34 in the casing 26. The interruption 78 is aligned with the bulged portion 42 of the casing 26 for a purpose to be described below.

Referring now to FIG. 3, a circular aperture 84 is formed through portions of the clapper support member 72 wherein the interruption 78 is formed and the aperture 84 extends about a chord 85 which intersects the interruption 78 substantially perpendicularly to the radius of the clapper support member 72 about which the interruption 78 is formed. The clapper assembly 70 includes a clapper 86 which is pivotally mounted on the clapper support member 72 via a pin 98 disposed partially in the aperture 84 as will now be described.

The clapper 86 has a circular outer periphery 88 and, as shown in FIG. 2, opposing parallel first and second sides, 90 and 92 respectively. A tab 94 is formed on the outer periphery 88 of the clapper 86 and extends radially therefrom. The width of the tab 94 is slightly smaller than the width of the interruption 78 formed in the clapper support member 72 such that the tab 94 will slide within the interruption 78 and the clapper 86 can be pivotally mounted on the clapper support member 72 via the interruption 74 and the tab 94. In particular, a transverse, circular hole 96 is formed through the tab 94 and the clapper assembly 70 is assembled by aligning the hole 96 with the aperture 84 in the clapper support member 72 and inserting the circular pin 98 through the hole 96 with portions of the pin 98 extending into the aperture 84 to either side of interruption 78 as has been shown in FIG. 3. The hole 96 is positioned in the tab 94 such that the clapper 86 can be pivoted to a closed position wherein the clapper 86 is disposed coaxially with the clapper support member 72 and the second side 92 of the clapper 86 lies in the plane of the second end of the clapper support member 72. Portions 100 of the outer periphery 88 of the clapper 86 adjacent the first side 90 thereof can be chamfered and a central depression 102 (see FIG. 1) can be formed in the second side 92 of the clapper 86 to reduce the weight of the clapper 86 in the usual manner.

As has been previously noted, the interruption 78 formed in the clapper support member 72 is aligned with the bulged portion 42 of the casing 26 in the assembled valve 20. Such alignment permits the clapper to pivot to an open position shown in phantom lines in FIG. 1, wherein the clapper 86 extends substantially axially from the clapper support member 72 and into the bulged portion 42 to permit a flow of fluid through the valve 20 in the usual manner. Thus, when fluid pressure is exerted in a conduit wherein the valve 20 is disposed to force fluid in a direction from the inlet passage formed by the bore 50 to the outlet passage formed by the bore 34, the clapper 86 swings to the open position thereof to permit fluid flow through the valve 20. Conversely, when fluid pressure is exerted in a conduit wherein the valve 20 is disposed in a direction tending to force a backflow of fluid through the valve 20, the weight of the clapper 86 pivots the clapper 86 into the backflow of fluid through the valve and such backflow forces the clapper 86 into the closed position thereof as shown in solid lines in FIG. 1. Since the second side 92 of the clapper 86 is aligned with the second end 82 of the clapper support member 72 in the closed position of the clapper 86, and since the second end 82 of the clapper support member 72 abuts the first side 58 of the seal member 52 in the assembled valve 20, the clapper 86 is forced against the first side 58 of the seal member to prevent backflow through the valve 20 in the usual manner. In particular, the force of fluid pressure tending to establish a backflow urges portions of the second side 92 of the clapper 86 against the sealing ring 68 disposed in the groove 66 of the seal member 52 to form a seal across the valve assembly bore formed by the bores 76 and 56 of the clapper support member 72 and seal member 52 respectively.

The above recited construction of the valve assembly 24 provides for the economical manufacture thereof in that surfaces which mate to close the valve are readily accessible for machining operations and such operations include only simple milling and turning. Moreover, the construction of the valve 20 as described above permits the valve 20 to be rapidly repaired should the valve assembly 24 become worn to the extent that leakage occurs to permit a backflow of fluid through the valve 20. In such event, the valve 20 is removed from the conduit wherein the valve 20 is disposed and the cap 44 is unbolted from the casing 26 and removed therefrom. Such removal opens the valve assembly pocket formed by the ridge 38, the first side 46 of the cap 44 and the counterbored portion 36 of the interior surface 40 of the casing 26 such that the worn valve assembly 24 can be readily grasped and removed from the casing 26. A new valve assembly 24 is then inserted into the valve assembly pocket via insertion of a new clapper assembly 70 followed by insertion of a new seal member 52. The cap 44 is again bolted to the second end 30 of the casing 26 and the valve 20 is replaced in the conduit from which it was removed for repair. It will be noted that should only a portion of the valve assembly 24 be worn, such portion can be readily replaced in the field with a concomittant saving in the cost of repair.

Referring now to FIG. 4, shown therein is a fragmentary view of a modification of a valve, designated 20a, constructed in accordance with the present invention. The valve 20a includes a modified valve assembly, designated 24a, and the body 22a of the valve 20a is modified in accordance with the modified structure of the valve assembly 24a. The valve assembly 24a includes a clapper assembly 70 which is identical to the clapper assembly 70 of the valve assembly 24. The seal member 52a of the valve assembly 24a differs from the seal member 52 of the valve assembly 24 in several respects. In the valve assembly 24, sealing between the clapper 86 and the seal member 52 and between the seal member 52 and the body 22 of the valve 20 is affected via elastomeric sealing rings 64 and 68 in a generally rigid seal member 52. In the valve assembly 24a, the seal member 52a is constructed of a yieldable polymeric material such as polytetrafluoroethylene and the elastomeric sealing rings are dispensed with. In order to firmly support the seal member 52a in the valve body 22a, a second counterbore 130 is formed in the second end 30a of the casing 26a and an annular lip 132 is formed on the first end 46a of the cap 44a and extends therefrom to underlay and engage the bore 56a of the seal member 52a. The seal member 52a extends from the lip 132 into the second counterbore 130 for radial support and extends from the first end 46a of the cap 44a to the counterbore 36a wherein the clapper assembly 70 is disposed for longitudinal support within the valve 20a.

FIG. 5 shows a portion of another modification of a valve 20b constructed in accordance with the present invention and having a valve body 22 identical to the valve body 22 of the valve 20. The valve 20b differs from the valve 20 in that the valve 20b includes a modified valve assembly 24b.

In the valve assembly 24b, the outer periphery 54b of the seal member 52b is formed on a slightly smaller diameter than the counterbore 36 forming the valve assembly pocket in the casing 26. In addition to the annular groove 62b formed in the second side 60b of the seal member 52a, a second annular groove 104 is formed in the first side 58b of the seal member 52b, the annular groove 104 intersecting the outer periphery 54b of the seal member 52b. The elastomeric sealing ring 64 of the seal member 52 is replaced, in the seal member 52b, with an elastomeric sealing ring 106 having a generally U-shaped cross-section and having portions disposed in the annular groove 104 as well as in the annular roove 62b. A portion of the sealing ring 106 extends across the outer periphery 54b of the seal member 52b to enhance the seal between the seal member 52b and the casing 26. The portion of the elastomeric sealing ring 106 disposed in the groove 104 provides a seal between the seal member 52b and the clapper assembly 70b. Similarly, a groove 108 is formed in the second side 60b of the seal member 52b symmetrically with the groove 66b corresponding to the groove 66 of the seal member 52. An elastomeric sealing ring 110 is disposed in the groove 108 in the same manner that an elastomeric sealing ring, designated 68b in FIG. 5, is disposed in the groove 66b in the first side 60b of the seal member 52b. The symmetric construction of the seal member 52b is particularly useful in that the first and second sides, 58b and 60b respectively, of the seal member 52b are interchangeable. Accordingly, such construction eliminates the possibility that inexperienced personal will engage the wrong side of the seal member with the clapper assembly 70b such that backflow leakage might occur in the assembled valve. With the above described construction of the seal member 52b, either side 58b, 60b will form a seal with the first end 46 of the cap 44 and either side thereof will form a seal with the clapper 86b.

FIG. 5 also shows a simpler construction of the clapper 86b. In the valve assembly 70b, the clapper 86b has the form of a circular disc with the tab 94b thereof attached to a cylindrical periphery 88b.

FIGS. 6 and 7 have been included to show simplified constructions of the clapper support member forming a part of the valve assembly utilized in a valve constructed in accordance with the present invention. In each of the modified clapper support members, designated 72c and 72d in FIGS. 6 and 7 respectively, the circular aperture 84 of the clapper support member 72 is replaced by a slot. In particular, in the clapper support member 72c, an aperture 84c has the form of a slot intersecting the outer periphery 74c of the clapper support member 72c and extending radially inwardlly therefrom. When the valve containing the clapper support member 72c is assembled, portions of the casing 26, forming the counterbore 36 which provides the valve assembly pocket, overlay the aperture 84c to prevent disengagement of the clapper from the clapper support member 72c. In the clapper 72d, shown in FIG. 7, the aperture 84d used for pivotally mounting the clapper, such as a clapper 86 or a clapper 86b, on the clapper support member 72d is similarly a slot. However, the aperture 84d intersects the second end 82d of the clapper support member 72d rather than the periphery 74d thereof and the aperture 84d extends toward the first end 80d of the clapper support member 72d. In the assembled valve containing the clapper support member 72d, the engagement between the second end 82d of the clapper support member 72d with the seal member, such as the seal member 52 or the seal member 52b, prevents disengagement between the clapper and the clapper support member 72d.

FIG. 8 shows another modification, designated 24e, of a valve assembly suitable for use with the casing 26 and the cap 44 to form a valve constructed in accordance with the present invention. The valve assembly 24e comprises a seal ring 52e wherein a portion 120 of the bore 56e of the seal member 52e, adjacent the first side 58e thereof, is shaped to conform to a portion of a spherical surface to provide a sealing surface against which portions of the clapper, designated 86e in FIG. 3, bear to seal the valve assembly 24e against backflow. A similarly formed sealing surface 122 is formed on portions of the clapper 86e adjacent the second side 92e thereof to engage the spherically shaped portion 120 of the bore 56e of the seal member 52e. In order that the elastomeric sealing ring 68e, comparable to the elastomeric sealing ring 68 of the valve assembly 24, engage the sealing surface 122 of the clapper 86e, the groove 66 in the first side 58 of the seal member 52 is replaced in the seal member 52e with a groove 124 having a generally frusto-conical shape converging toward the sealing surface 122. A chamfer 126 is formed about the bore 76e of the clapper support member 72e of the valve assembly 24e and the elastomeric sealing ring 68e, also having a generally frusto-conical form, is disposed between the chamfer 126 ahnd the groove 124 such that the sealing ring 68e is clamped between the seal member 52e and the clapper support member 72e in the assembled valve assembly 24e and the elastomeric sealing ring 68e extends to and engages the sealing surface 122 formed on the clapper 86e.

Changes may be made in the construction and arrangement of the parts or the elements of the various embodiments as disclosed herein without departing from the spirit and scope of the invention as defined in the following claims.

What is claimed is:

1. A tilting disc check valve, comprising:
   a body having formed therein a valve chamber, an inlet passage fluidly communicating with the valve chamber and an outlet passage fluidly communicating with the valve chamber, wherein a valve assembly pocket is formed within the valve chamber adjacent the inlet passage for positioning a valve assembly within the valve chamber; and
   a valve assembly disposed within the valve assembly pocket, comrpising:
      a seal member disposed in the valve chamber and sealingly engaging portions of the body about the inlet passage of the body, the seal member having a bore formed therethrough in fluid communication with said inlet passage; and
      a clapper assembly disposed in the valve chamber between the seal ring and the outlet passage, comprising:
         a clapper support member having the form of an interrupted circular ring, the clapper support member abutting the seal member and having a bore formed therethrough communicating with the bore formed through the seal member, wherein portions of the clapper support member forming the bore formed therethrough are disposed radially outwardly of portions of the seal member forming the bore through the seal member, the interruption extending from the clapper support member bore to an outer peripheral surface thereof and extending therebetween substantially symmetrically about a radius of the circular ring;
         a circular clapper; and
         a tab formed on the outer periphery of the clapper and extending therefrom into the interruption in the clapper support member, the tab being pivotally connected to the clapper support member for pivotation to a closed position of the valve wherein the clapper enters the bore formed through the clapper support member to engage the seal member in an occluding relation with the bore formed through the seal member and for pivotation to an open position wherein the clapper disengages the seal member to permit fluid flow through the valve.

2. The valve of claim 1 wherein the clapper support member abuts the seal member at an annular, planar face formed on the seal member and extending radially from the bore formed therethrough; and wherein a planar face is formed on one side of the clapper to engage the annular, planar face on the seal member in the closed position of the valve to occlude the flow passage bore.

3. The valve of claim 2 wherein an annular groove is formed in the annular, planar face of the seal member, said groove being positioned such that the planar face of the clapper overlays said groove in the closed position of the valve; and wherein an elastomeric sealing member is disposed in said groove for forming a seal between the clapper and the seal member.

4. The valve of claim 2 or claim 3 wherein the seal member has the form of an annular ring having a second annular, planar face formed on the side of the seal member opposite the side abutted by the clapper support member; wherein an annular, planar face is formed on the valve body abutting said second annular face of the seal member; wherein an annular groove is formed in said second annular face of the seal member intersecting the periphery of the seal member; and wherein the valve assembly further comprises an elastomeric sealing ring disposed in the annular groove formed in said second annular face of the seal member, said elastomeric sealing ring engaging the annular, planar face formed on the valve body and abutting the seal member to provide a seal between the valve chamber and the inlet passage of the valve.

5. The valve of claim 2 or claim 3 wherein the seal member has the form of an annular ring having a second annular, planar face formed on the side of the seal member opposite the side thereof abutted by the clapper support member; wherein an annular, planar face is formed on the valve body abutting said second annular face of the seal member; wherein annular grooves are formed on both sides of the seal member intersecting the outer periphery thereof; wherein the valve assembly pocket has a circular periphery having a diameter larger than the periphery of the seal member; and wherein a U-shaped elastomeric sealing member is disposed in the grooves formed in the sides of the seal member and extends therebetween across the outer periphery of the seal member to engage the periphery of the valve assembly pocket.

6. The valve of claim 1 wherein a transverse circular hole is formed through the tabe formed on the clapper; wherein an aperture is formed along a chord of the clapper support member and the aperture intersects the interruption in the clapper support member; and wherein the clapper assembly includes a circular pin extending through the hole in the tab and into the aperture in the clapper support member to either side of the tab for pivotal mounting of the clapper via the tab.

7. The valve of claim 6 wherein the aperture in the clapper support member has the form of a circular hole extending circumaxially about said chord of the clapper support member.

8. The valve of claim 6 wherein the aperture has the form of a slot intersecting the outer circular periphery of the clapper support member.

9. The valve of claim 6 wherein the aperture has the form of a slot intersecting one end of the clapper support member, said end adjoining the seal member, whereby the seal member retains the pin in the aperture.

10. The valve of claim 1 wherein a sealing surface, shaped to conform to a portion of a spherical surface, is formed on the bore of the seal member and extends circumferentially thereabout adjacent the side thereof abutting the clapper support member; and wherein a mating surface is formed on the periphery of the clapper to mate with said sealing surface on the seal member in the closed position of the valve.

11. The valve of claim 10 wherein an annular groove is formed in the seal member to intersect the sealing surface formed thereon; wherein a chamfer is formed about the bore of the clapper support member to align with the groove formed in the seal member and intersecting the sealing surface thereof; and wherein the valve assembly further comprises an elastomeric sealing ring positioned in the groove formed in the seal member to intersect the sealing surface thereof and engaging the chamfer formed about the bore of the clapper support member, said elastomeric sealing ring engaging the surface formed on the clapper to mate with the sealing surface of the seal member in the closed position of the valve.

12. The valve of claim 1 or claim 2 wherein the seal member is characterized as being constructed of a yieldable, polymeric material.

13. A valve assembly for a tilting disc check valve comprising:
a clapper assembly, comprising:
a clapper support member having the form of an interrupted circular ring whereby the clapper support member has a bore formed therethrough interruption extending from the clapper support member bore to an outer peripheral surface thereof and extending therebetween substantially symmetrically about a radius of the circular ring;
a clapper, sized to fit within the bore formed through the clapper support member; and
a tab, formed on the clapper and extending therefrom into the interruption in the clapper support member, the tab being pivotally connected to the clapper support member for pivotation of the clapper into and out of the bore formed through the clapper support member; and
a ring-shaped seal member adjoining one side of the clapper support member to engage the clapper when the clapper is pivoted into the bore formed through the clapper support member.

14. The valve assembly of claim 13 wherein the seal member is characterized as being constructed of a yieldable polymeric material.

* * * * *